(12) United States Patent
Boulanger et al.

(10) Patent No.: US 6,583,808 B2
(45) Date of Patent: Jun. 24, 2003

(54) METHOD AND SYSTEM FOR STEREO VIDEOCONFERENCING

(75) Inventors: Pierre Boulanger, Edmonton (CA); Guy Godin, Ottawa (CA)

(73) Assignee: National Research Council of Canada, Ottawa (CA)

( * ) Notice: Subject to any disclaimer, the term of this patent is extended or adjusted under 35 U.S.C. 154(b) by 65 days.

(21) Appl. No.: 09/969,749

(22) Filed: Oct. 4, 2001

(65) Prior Publication Data

US 2003/0067536 A1 Apr. 10, 2003

(51) Int. Cl.[7] .................................................. H04N 7/14
(52) U.S. Cl. ............................... 348/14.09; 348/14.08; 348/14.16
(58) Field of Search ...................... 348/14.01–14.08, 348/14.09, 14.1, 14.11, 14.12, 14.13, 14.16, 169, 170, 171; 382/100, 103; 370/260, 261; 709/204; 345/753; H04N 7/14

(56) References Cited

U.S. PATENT DOCUMENTS

| | | | |
|---|---|---|---|
| 5,495,576 A | 2/1996 | Ritchey | 395/125 |
| 5,850,352 A | 12/1998 | Moezzi et al. | 364/514 A |
| 5,999,208 A | 12/1999 | McNerney et al. | 348/15 |
| 6,198,484 B1 | 3/2001 | Kameyama | 345/419 |
| 6,263,100 B1 | 7/2001 | Oshino et al. | 382/154 |

FOREIGN PATENT DOCUMENTS

| | | | | |
|---|---|---|---|---|
| JP | 406113336 A | * | 4/1994 | H04N/13/00 |
| JP | 406351013 A | * | 12/1994 | H04N/7/15 |
| JP | 10084539 A | * | 3/1998 | H04N/7/15 |

OTHER PUBLICATIONS

Seitz, Steve et al., "View Morphing", Online publication downloaded on Jun. 28, 2001.
"Real–Time Tracking of the Human Body", Online publication downloaded on Jun. 28, 2001.
Selected pages downloaded from the website of Dresden 3D on Jun. 29, 2001.
Selected page downloaded from the website of Fastgraph on Jul. 5, 2001.
Selected pages downloaded from the website of LinCom on Jul. 12, 2001.
Selected page downloaded from the website of Stereoscopy on Jul. 12, 2001.
Selected pages downloaded from the website of Studio 3D on Jul. 12, 2001.
Selected pages downloaded from the website of Ascension Technology Corporation on Jul. 13, 2000.

* cited by examiner

Primary Examiner—Melur Ramakrishnaiah
(74) Attorney, Agent, or Firm—Max R. Wood; Ogilvy Renault

(57) ABSTRACT

A system and method for stereoscopic video teleconferencing provides an immersive virtual meeting experience. Each participant is surrounded by at least two video cameras. The system senses the position of each of the participants and uses this information to select, for each participant, camera pairs to capture a stereo pair of video images of each of the other participants. The system is adapted to isolate the image of each participant from the background. The system transforms the stereo pair images to adjust the perspective for the interocular spacing of each participant. The processed stereo pairs of video images are transmitted to the respective participants. For each participant, the system assembles a stereo video display image of a virtual meeting room, combining the stereo pair images of each of the other participants appropriately sized and positioned. Three-dimensional (3D) virtual objects can also be displayed and manipulated by participants.

30 Claims, 5 Drawing Sheets

METHOD AND SYSTEM FOR STEREO VIDEOCONFERENCING

TECHNICAL FIELD

The present invention relates to the fields of virtual reality and teleconferencing, and in particular to three-dimensional videoconferencing.

BACKGROUND OF THE INVENTION

Teleconferencing permits people in different geographical locations to communicate without the time, effort and expense of travelling to a meeting place. Most current videoconferencing systems use a single camera and a single monitor at each location. If there are more than two locations participating in the videoconference, the video display is generally divided into windows, and a video image from each location is displayed in each window.

Other more recent technologies include immersive video, in which a three-dimensional model of an environment is created and a viewer can move around within this virtual environment. Computer generated images are created to provide the viewer with a perspective view from a virtual spatial location within the virtual environment.

One such system is disclosed in U.S. Pat. No. 5,850,352, which issued Dec. 15, 1998 to Moezzi et al. The patent describes an immersive video system that synthesizes images of a real-world scene. The synthesized images are linked to a particular perspective on the scene or an object in the scene. A user can specify various views, including panoramic or stereoscopic. The system uses computerized video processing (called "hypermosaicing") of multiple video perspectives on the scene. Multiple video cameras each at a different spatial location produce multiple two-dimensional (2D) video images of the scene. The system uses a video data analyzer for detecting and tracking scene objects and their locations, an environmental model builder for combining multiple scene images to build a three-dimensional (3D) dynamic model recording scene objects and their instant spatial locations. A visualizer generates one or more selectively synthesized 2D video image(s) of the scene using the 3D model and the viewing criterion.

Moezzi et al. require building a 3D dynamic model of an environment, and the people within the environment, from which stereo pairs are synthesized. Building 3D dynamic models of moving people and then synthesizing views of these models is computationally intensive and with currently available technology, can be prohibitively slow and expensive.

Another patent illustrating the state of the art is U.S. Pat. No. 5,999,208, which issued Dec. 7, 1999 to McNerney et al. The patent describes a virtual reality mixed media meeting room which provides a user with a visually familiar conference format. The various aspects of the virtual reality conference are presented in a rendering that emulates the physical appearance and presence of the physical participants and communication devices that would be present in a traditional conference room. Each conference participant is represented on a display by his/her image in a selected chair. Conference participants can share applications and jointly participate in the modification of presentations and displays, but the participants are not realistically represented and cannot move around within the meeting room.

There therefore exists a need for a method and system for stereo videoconferencing that can provide an immersive three-dimensional experience to permit meeting participants to interact with each other in a realistic way, while avoiding the computationally intensive process of computing participants' images using three-dimensional models.

SUMMARY OF THE INVENTION

It is therefore an object of the invention to provide a method for stereo videoconferencing that provides a realistic immersive three-dimensional environment for participants.

It is a further object of the invention to provide a system for stereo videoconferencing that efficiently uses bandwidth to support real-time seamless, immersive, three-dimensional videoconferencing.

The virtual meeting room system of the present invention is designed to create the illusion of immersion in a real meeting by recreating stereoscopic views of a virtual meeting from the viewpoint of a participant. Instead of creating dynamic 3D models of participants, the system only transmits stereo pairs of video images of each participant to each of the other participants.

In accordance with another aspect of the present invention, the system further comprises means for determining the position of a participant's head and hands to permit interaction with objects in the virtual environment.

In accordance with an aspect of the invention, there is provided a stereo videoconferencing system for at least two participants in at least two separate locations, comprising: means in each location for providing a reference point; means for sensing a position of each participant with respect to the reference point; means for capturing at least two video images of each participant, each video image being from a different perspective; means for computing a stereo pair of video images of each participant for each of the other participants using at least two video images and the respective position of each of the other participants; means for communicating the respective stereo pairs of video images of each participant to each of the other participants; and means for assembling a stereo video display image for each of the participants, using the position data and the stereo pairs of video images.

In accordance with another aspect of the present invention, there is provided a method for stereo videoconferencing system for at least two participants in at least two separate locations, comprising steps of: providing a reference point at each location; sensing a position of each participant with respect to the reference point; capturing at least two video images of each participant, each video image being from a different perspective; computing a stereo pair of video images of each participant for each of the other participants; communicating the respective stereo pairs of video images of each participant to each of the other participants; and assembling a stereo video display image for each of the participants, using the position data and the stereo pairs of video images.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a system and method for integrating and synchronizing multi-source data, images and sounds to provide a single seamless, immersive videoconferencing environment for a plurality of participants respectively located in a plurality of different locations. The system permits multiple participants to experience an illusion of immersion in a real meeting in a three-dimensional (3D) virtual space. Furthermore, although the participants are physically separated from each other, the 3D images of each participant appear in the 3D virtual space of each other participant, and synchronized, integrated stereo sound provides a sensation of juxtaposition with other participants in the virtual meeting. The system also supports the display and manipulation of 3D virtual models within the virtual meeting space.

Figure 1:
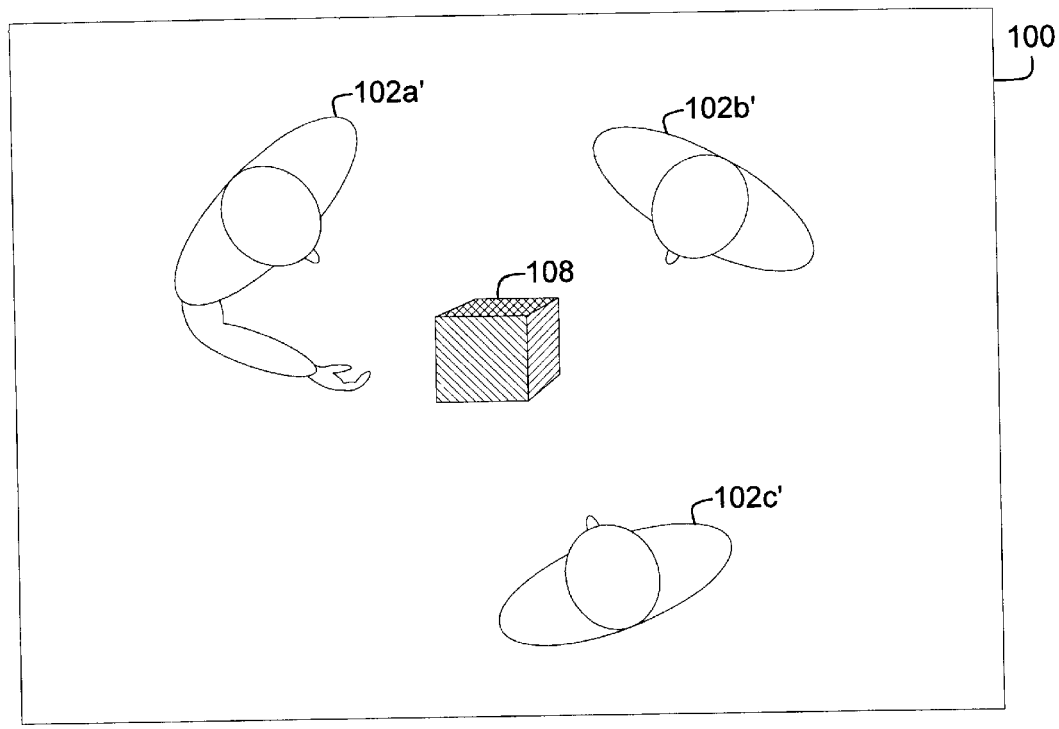
FIG. 1 is a schematic diagram illustrating a virtual meeting room and virtual participants in accordance with an exemplary embodiment of the present invention.

FIG. 1 illustrates a virtual meeting room 100 in accordance with an exemplary embodiment of the invention. Although the virtual meeting room 100 is shown in plan view for simplicity of illustration, it should be understood that each participant perceives a fully immersive, 3D experience of the room and the other participants. The virtual meeting room 100 can be programmed to represent substantially any desired virtual environment. Participants are represented as virtual 3D images 102a', 102b', 102c' in the virtual meeting room 100. Virtual objects 108 can also be displayed and can be manipulated by one or more participants. Manipulation of virtual objects will be further described with reference to FIGS. 5 and 6.

Figure 2:
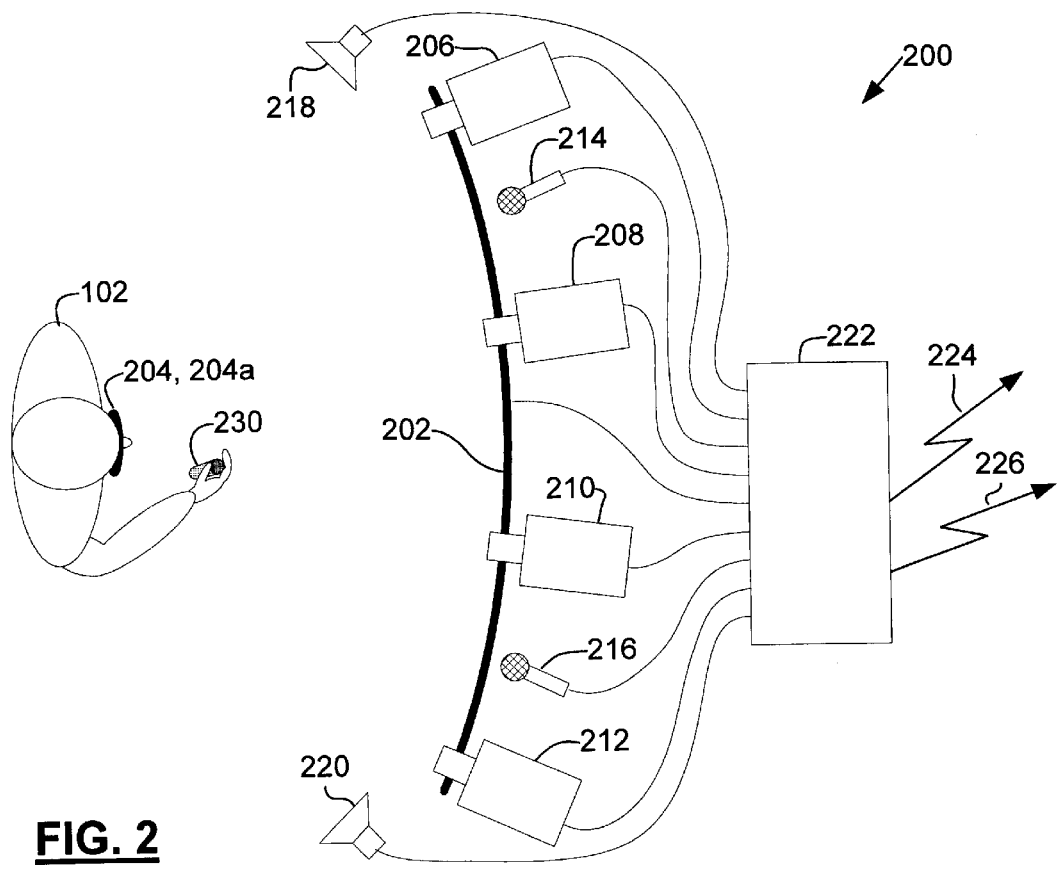
FIG. 2 is a schematic diagram illustrating equipment at a participant's location in accordance with an exemplary embodiment of the present invention.

FIG. 2 is a schematic diagram illustrating an equipment setup 200 at a participant's 102 location in accordance with an embodiment of the invention. Each participant 102 is provided with a plurality of interfaces connected to a processor 222. The interfaces consist of at least two video cameras, for example video cameras 206, 208, 210, 212; at least one and, preferably, two microphones 214, 216; at least two speakers 218, 220; one or more visual displays 202; and at least one motion/position tracker 230. The processor 222 is illustrated as a single computer, but it can consist of one or more computers that share the computational load of collecting display data, and synthesizing and displaying the virtual meeting room.

The participant 102 faces the video cameras 206, 208, 210, 212, each of which provides a different perspective of the participant. In the exemplary diagram, four video cameras are shown. At least two or more video cameras are required to provide a stereoscopic effect. More cameras around the participant provide a broader range of perspectives, improving the realism of the virtual experience and permitting more freedom of movement within the virtual space.

A plurality of microphones 214, 216 is provided to capture the participant's voice and other sounds. A plurality of speakers 218, 220 is provided to reproduce sounds captured from remote participants' locations. A 3D display is provided to permit the participant 102 to view 3D representations of other participants and virtual objects.

In one embodiment of the invention, the 3D display includes a video monitor or projection screen 202 that displays interlaced video pairs alternating a left-eye image and a right-eye image. The participant 102 wears active liquid crystal shuttered goggles 204 synchronized with the display to alternate between the left-eye view and the right-eye view, so that the participant's left eye sees only the left-eye views and the participant's right eye sees only the right-eye views, as is well understood in the art of stereo video. The participant may also wear a head mounted display (HMD) 204a, which projects the respective stereo images onto lenses supported in front of each of the participant's eyes.

In another embodiment, the 3D display includes cross-polarized left and right images projected onto a metallic screen 202 and the participant 102 wears passive cross-polarized goggles 204, as is also well understood in the art. In a further embodiment, the cross-polarized goggles 204 are replaced with cross-polarized contact lenses (not shown) to provide a better view of the participant's face.

The position of the participant 102 is determined, relative to a reference point, in order to position the participant with respect to other participants in the virtual meeting room. In one embodiment, the position is determined by processing the video images captured by the video cameras. In another embodiment, the position is determined by a magnetic sensor or other tracking mechanism carried by the participant or mounted to the shuttered goggles 204, or the HMD 204a. An example of a magnetic tracker is the Flock of Birds™ product from Ascension Technologies located in Burlington, Vt., United States of America.

Figure 3:
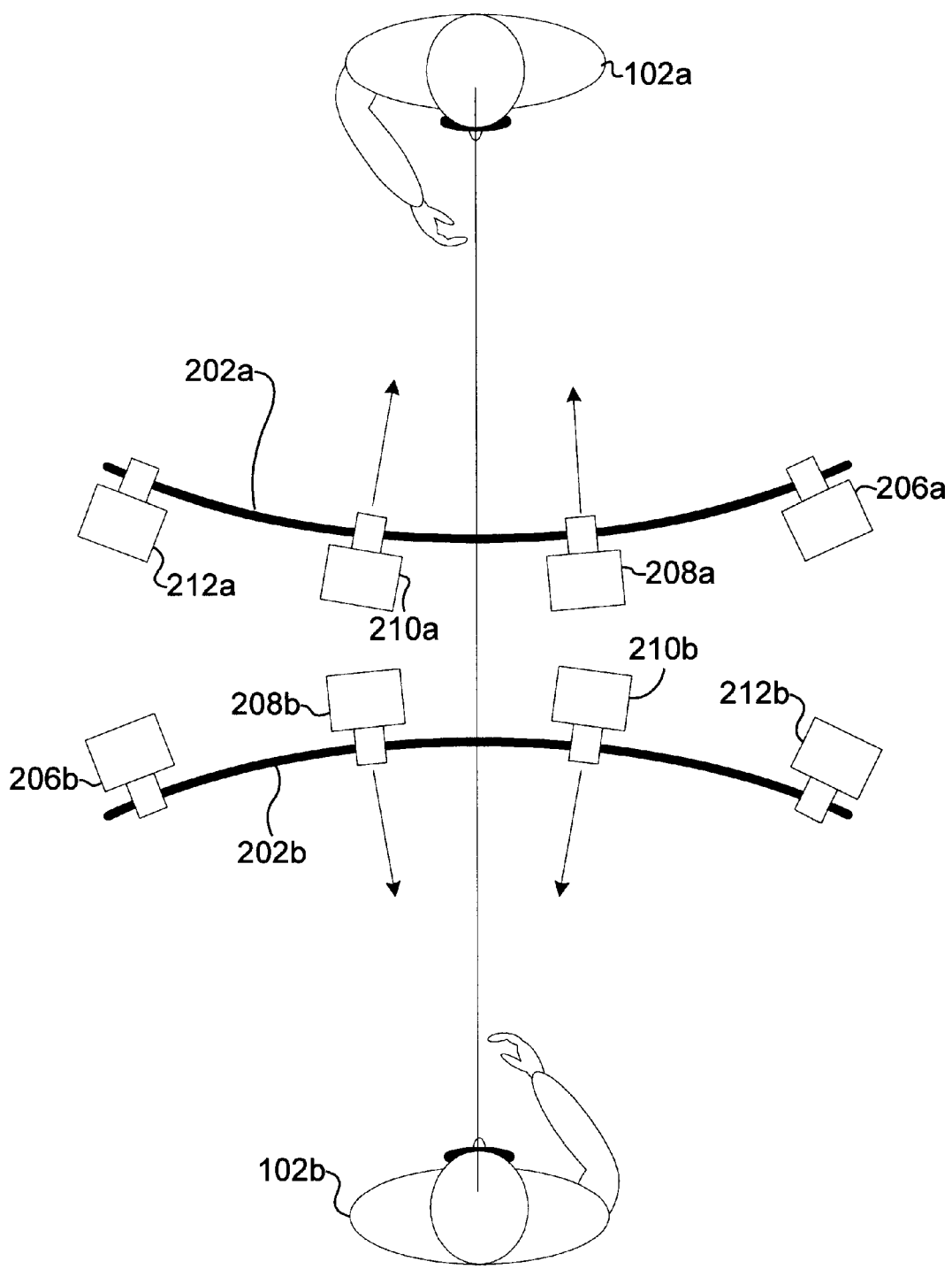
FIG. 3 is a schematic diagram of an exemplary embodiment of the present invention, illustrating the interaction between two participants.

The operation of the present invention will now be described with respect to FIGS. 3 and 4, which represent a virtual meeting between two participants 102a and 102b. As shown in FIG. 3, the participants 102a, 102b respectively face equipment 200a, 200b at their respective locations, and perceive a virtual 3D image of the other participant 102b, 102a, as if they were located as shown, regardless of the physical orientation of the two locations with respect to each other.

The system determines, using data from position sensors 230 (FIG. 2) or image analysis, the positions of the participants 102a, 102b, and computes the cameras (208a and 210a in this example) that most closely approximate a view of participant 102a from the perspective of participant 102b. The system then selects those two cameras to supply video images of the participant 102a to the participant 102b, so long as a position of the two participants 102a, 102b remains relatively the same. The system similarly selects cameras 208b and 210b to supply video images of participant 102b to the participant 102a. The system then separates the image of each participant 102a, 102b from the background that appears in the respective video images. This can be done using any one of several techniques well known to persons skilled in the art, such as pixel extraction using a background mask The system then transforms these respective video image pairs to create a stereo pair of video images separated by a nominal interocular spacing of participant 102b. Multi-view transformation, generally referred to as "morphing", are well known to persons skilled in the art of video processing. Each transformed video pair is then transmitted to the other participant 102a, 102b and incorporated into the respective participant's view of the virtual meeting.

As participants move around at their respective locations, the system tracks their position and selects appropriate camera pairs. In the example shown in FIG. 4, when participant 102b moves forward and to the right of the position shown in FIG. 3, the system selects cameras 210b and 212b to capture views of participant 102b. The system likewise selects cameras 208a and 206a for providing the most appropriate perspective for capturing views of participant 102a to be supplied to participant 102b.

The position information related to each participant is also preferably used to process the captured audio of each participant's voice, in order to reproduce the sound of each participant's voice in the 3D space of the virtual meeting room, as will be explained below in more detail.

Figure 4:
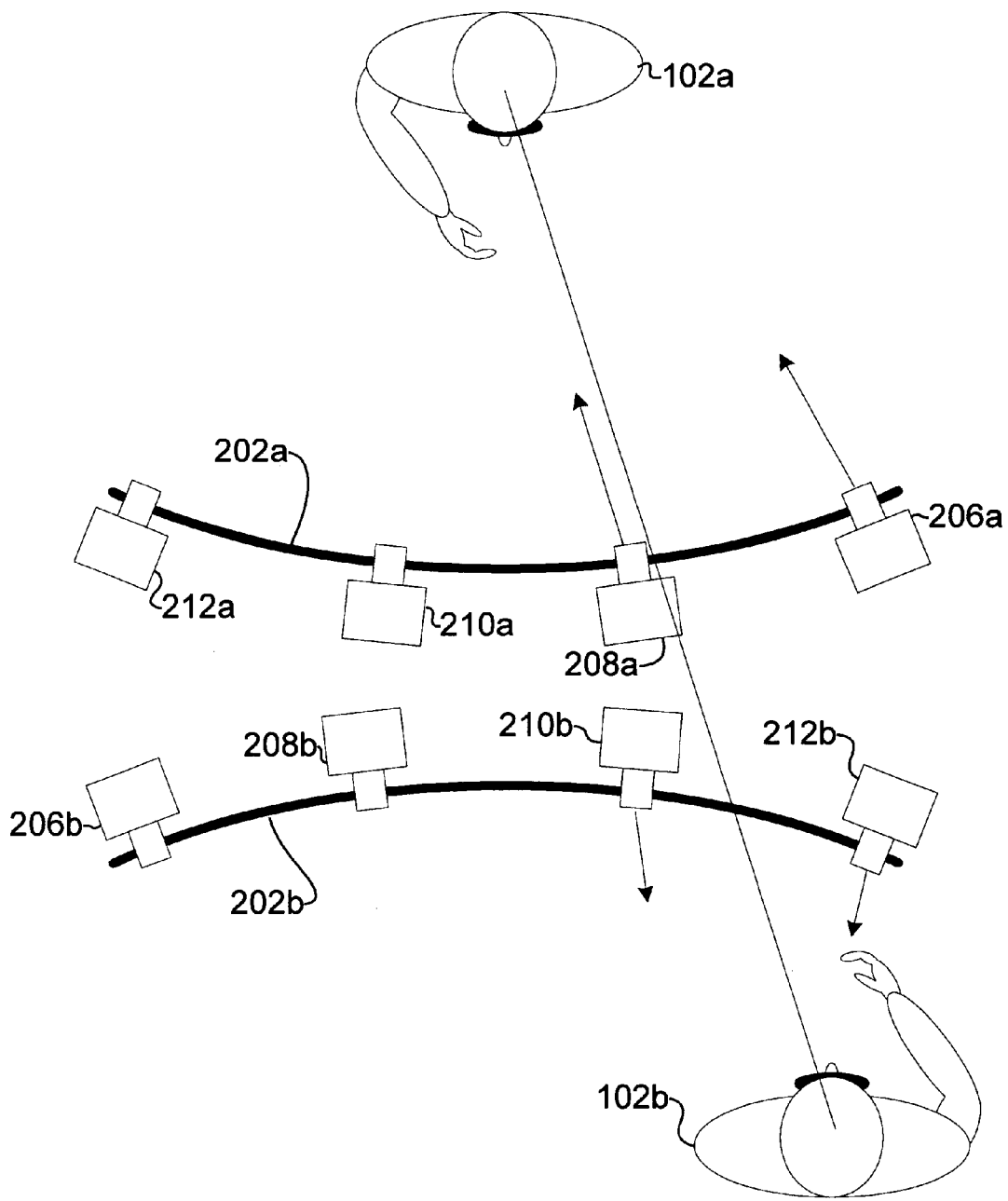
FIG. 4 is a schematic diagram of an exemplary embodiment of the present invention, similar to FIG. 3, wherein one of the participants has moved.

As will be understood by those skilled in the art, although the system illustrated in FIGS. 3 and 4 shows only two participants for ease of illustration, the number of participants is limited only by the processing power available at the respective sites. As will be explained below in detail, due to the algorithms used for reducing data exchange, and local image processing, the number of participants in a virtual meeting can be quite large.

Figure 5:
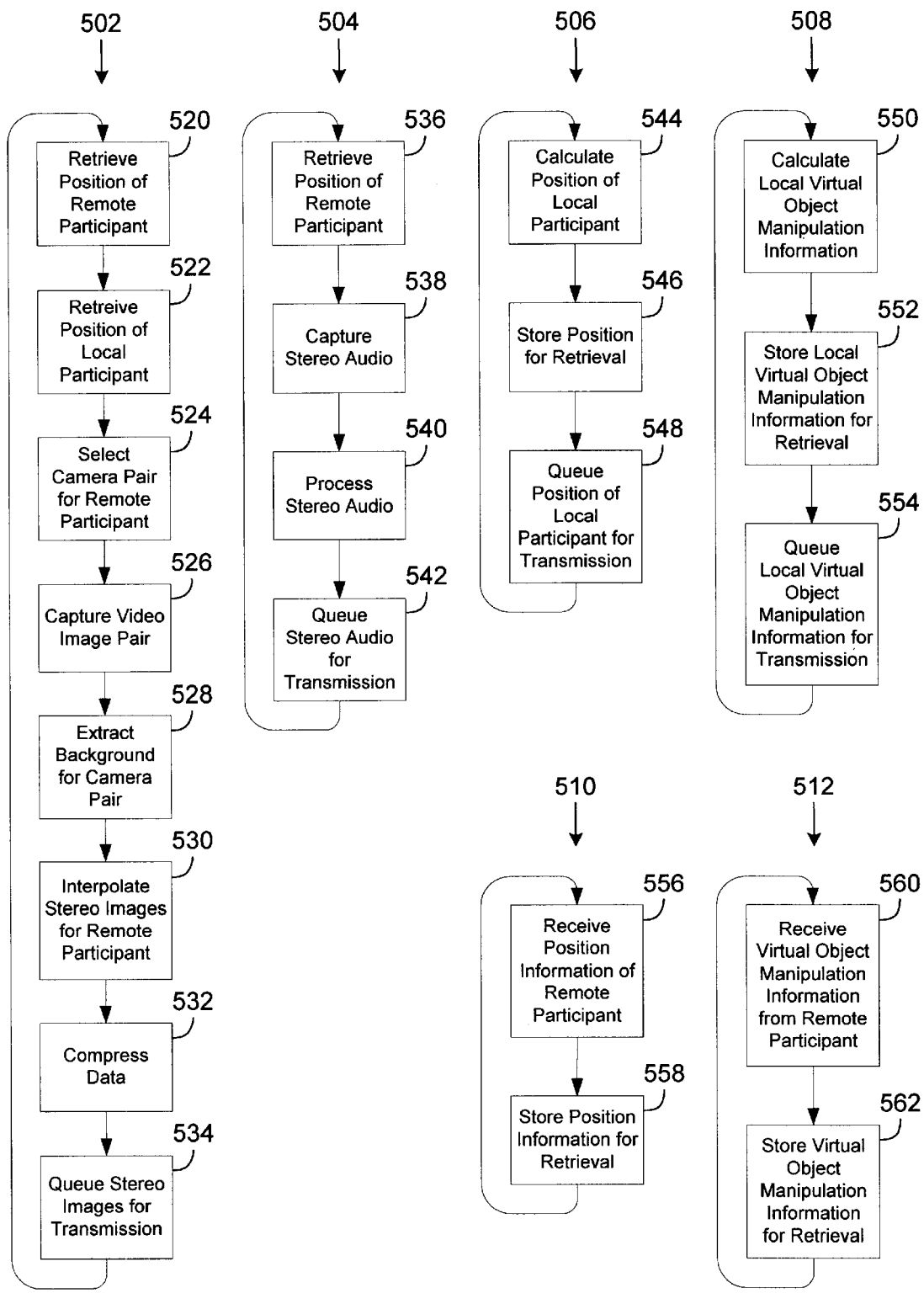
FIG. 5 is a flowchart illustrating processes involved in creating and collecting image information in accordance with an exemplary embodiment of the present invention.

The processes of the present invention will now be described with respect to the flow diagrams shown in FIGS. 5 and 6, from the perspective of one local participant in a virtual meeting with one remote participant. This description is applicable to each participant in a virtual meeting.

The processing required to provide the stereo videoconferencing in accordance with the invention is performed in a plurality of parallel processes 502–512 (FIG. 5) and 602,604 (FIG. 6) simultaneously performed by one or more processors on one or more computing machines, in a manner well known in the art.

A flow diagram 502 outlines a principal video capture process continually executed at each participant location. At step 520, position information related to a position of the remote participant in the virtual meeting room is retrieved from a register where it was stored when it was received in a video data stream sent by the remote participant's equipment, as will be explained below with reference to flow diagram 506. At step 522 the position information of the local participant is retrieved from another register where it was also stored. At step 524, the system uses the position information of both the local participant and the remote participant to select a camera pair for capturing video images of the local participant. At step 526, the image pair is captured from output of the selected cameras. The background pixels are removed from the images of the local participant (step 528), as explained above. At step 530, the system uses the position information of the local participant and the remote participant to transform the image pairs to produce a stereo pair of video images representative of the interocular spacing of the remote participant from the perspective of the remote participant position in the virtual meeting room with respect to the local participant. The stereo pair of images devoid of background are compressed at step 532. At step 534, the compressed stereo pair of video images is queued for transmission to the remote participant. The process then returns to step 520 and is repeated.

Flow diagram 504 illustrates a concurrent audio capture process. At step 536, the position of the remote participant is retrieved from storage. At step 538, the local participant's voice and other local sounds are captured using at least two audio channels. The audio information is processed to adjust relative volumes and/or phases of each audio channel at step 540 to reproduce the recorded sound of the local participant's voice relative to the position of the remote participant by synthesizing stereo sound in a manner well known in the art. The stereo sound is then queued for transmission to the remote participant (step 542) and the process returns to step 536 and is repeated.

Flow diagram 506 illustrates a process for capturing and storing a position of each participant. The position of the local participant is determined at step 544 by monitoring output of the motion/position tracker 230 (FIG. 2). The position information is stored in a register at a local processor in step 546 for retrieval by other parallel processes, as described above. The position information is also queued (step 548) for transmission in a video data stream to the remote participant. The process then returns to step 544 and the process is repeated.

Flow diagram 508 illustrates the principal steps in the process used to track information related to the manipulation of virtual object(s) by the local participant. Virtual objects are mathematical models of three-dimensional objects. These virtual objects can be imported into virtual meetings from modeling programs such as computer-aided design (CAD) programs and the like, and manipulated by the participants (moved, rotated, etc.). Preferably, a motion, position tracker 230 is reserved for virtual object manipulation and the tracker 230 is used in a predetermined way to move, rotate or flip the virtual object, using techniques that are known in the art. At step 550, local virtual object manipulation information is calculated if data output by the local motion/position tracker 230 associated with the virtual object requests any change in position or orientation of the object. In one embodiment of the present invention, the local participant can manipulate a virtual object by moving his hands. Video processing techniques can be used to interpret hand motion and translate it into virtual object manipulation information.

In another embodiment, the local participant can manipulate a magnetic tracking device held in one hand. The magnetic tracking device, such as a motion/position tracker 230 measures position and orientation information. At step 552, this manipulation information is stored in a local register. At step 554, the manipulation information is also queued for transmission to the remote participant. The process then returns to step 550 and the process is repeated.

A flow diagram 510 illustrates how virtual object position information received from a remote participant (step 556) is treated. This information is stored for retrieval (step 558). This process is then repeated from step 556.

Flow diagram 512 illustrates the handling of remote virtual object manipulation information. At step 560, remote virtual object manipulation information is received. This information is collected at the remote participant's location in a similar manner to that of the local virtual object manipulation information described with reference to flow diagram 508. At step 562, the remote object manipulation information is stored. The process then returns to step 560 and waits for the receipt of further virtual object manipulation information from remote participant(s).

Although the invention has thus far been described with reference to only one remote participant, it should be understood that multiple remote participants can participate in a virtual meeting. When there is more than one remote participant, each process described above (502, 504, 506, 508, 510, 512) is repeated for each remote participant. As will be understood by those skilled in the art, the various processes may be run concurrently or distributed among a plurality of computing machines.

Figure 6:
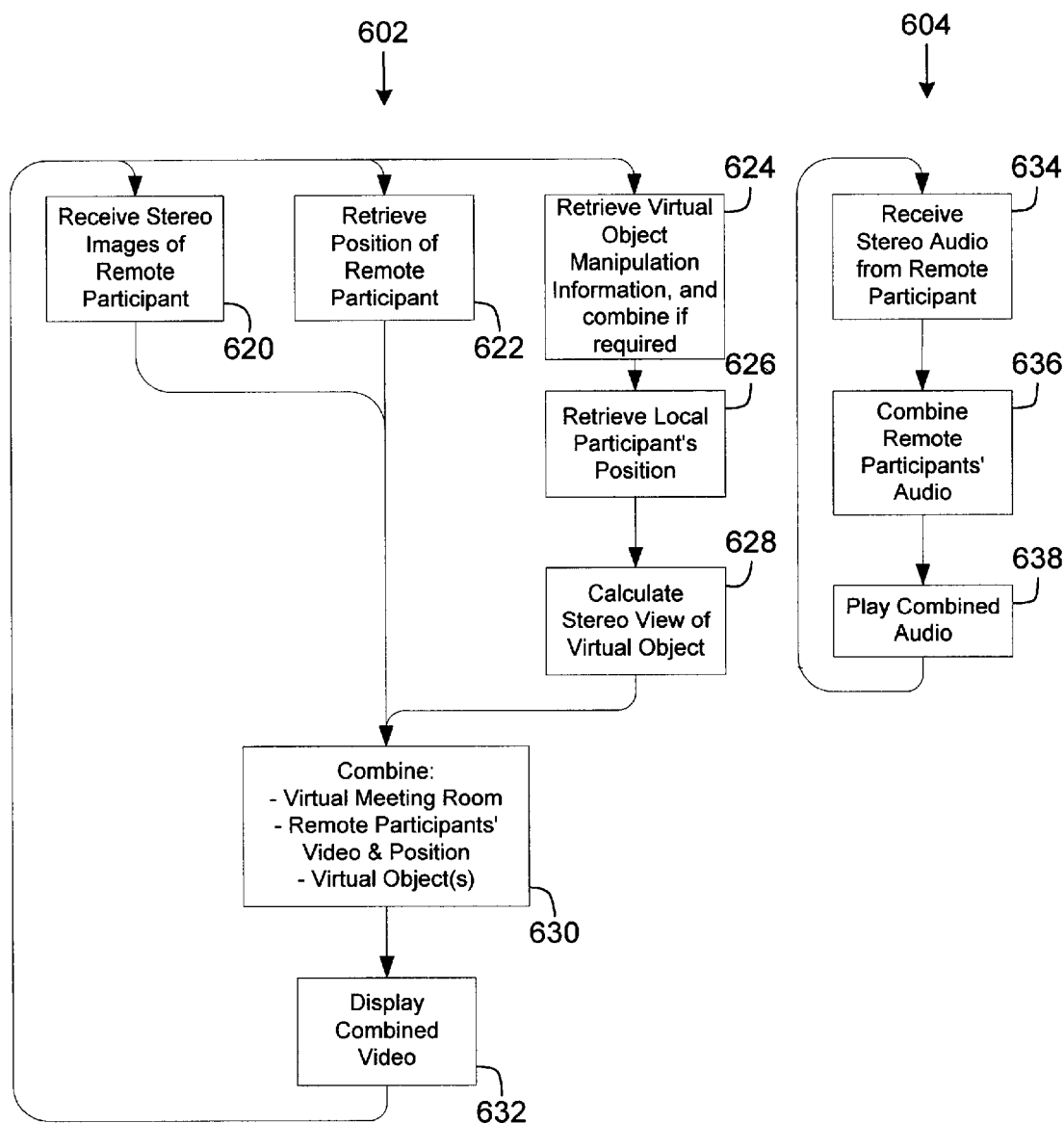
FIG. 6 is a flowchart illustrating processes involved in combining and displaying images for a participant in accordance with an exemplary embodiment of the present invention.

FIG. 6 includes a flow diagram 602 that illustrates a process for building display images viewed by the local participant in a virtual meeting. At step 620, a stereo pair of video images is received from each remote participant. At step 622, a position of each remote participant is retrieved from storage (see step 558, FIG. 5). At step 624, virtual object manipulation information from each participant is retrieved from storage (see step 552, FIG. 5), including that of the local participant. If virtual object manipulation information is retrieved for more than one participant, it is appropriately combined to determine an instant position and orientation of the virtual object at the time. At step 626, the local participant's position is retrieved. At step 628, the virtual object's position and orientation in conjunction with the local participant's position is used to render a stereo view of the virtual object model from the perspective of the local participant.

At step 630, the respective video images (remote participant's and virtual object(s)) are combined to create a composite stereo view for the local participant. The virtual meeting scene is rendered as a stereo pair of video images overlaid on the 3D virtual model of the meeting room, from the perspective of the position of the local participant. The position information of each remote participant is used to appropriately size and position the stereo pair of video images of each respective participant into the stereo pair view of the virtual meeting scene. The stereo pair of images of the virtual object is also inserted into the stereo pair view of the virtual meeting scene. The combined images are then displayed to the local participant at step 632, as a complete meeting scene. The process then returns to steps 620–624 to build the next stereo image pair of the virtual meeting scene for the local participant.

Flow diagram 604 illustrates handling of the audio information collected concurrently with the stereo image pairs. At step 634, the processed audio channels of each remote participant are received. At step 636, these audio signals are combined and at step 638 the combined audio signals are synchronized with the video images and played to the local participant through speakers 218,220 (FIG. 2).

In another embodiment of the invention, the audio can be played to the local participant through headphones (not shown). In that case, the system requires orientation information of the local participant's head in order to properly orient the position of the virtual sound sources. The position tracking information accumulated by the video image analysis process on the tracking mechanism 230 described above may be used for this purpose.

Each participant uses equipment configured in a similar way, for processing sound and image data in a similar manner. Consequently, the above description is applicable to each of the other participants in a virtual meeting.

The embodiment(s) of the invention described above is(are) intended to be exemplary only. The scope of the invention is therefore intended to be limited solely by the scope of the appended claims.

We claim:

1. A stereo videoconferencing system for at least two participants in at least two separate locations, comprising:
    means in each location for providing a reference point;
    means for sensing a position of each participant with respect to the reference point;
    means for capturing at least two video images of each participant, each video image being from a different perspective;
    means for computing a stereo pair of video images of each participant for each of the other participants using at least two video images and the respective positions of each of the other participants;
    means for communicating the respective stereo pairs of video images of each participant to each of the other participants; and
    means for assembling a stereo video display image for each of the participants, using the position data and the stereo pairs of video images.

2. The system as claimed in claim 1, further comprising means for isolating image data of each participant from image data associated with a background in the captured images before passing the images to the means for communicating.

3. The system as claimed in claim 2, wherein the means for computing a stereo pair of video images further comprises means for selecting two captured video images most closely representing a left-eye view and a right-eye view from a virtual perspective of the respective participants.

4. The system as claimed in claim 3, wherein the means for computing a stereo pair of video images further comprises means for transforming at least one of the two captured video images to create the left-eye view and the right-eye view from the virtual perspective of the respective participants.

5. The system as claimed in claim 2, wherein the means for computing a stereo pair of video images further comprises means for compressing data representing the digitized stereo pair of video images.

6. The system as claimed in claim 1, further comprising means for capturing audio information from each participant.

7. The system as claimed in claim 6, wherein the audio information comprises two or more audio channels captured from different positions relative to the reference point of each location.

8. The system as claimed in claim 7, further comprising means for computing a stereo audio channel pair associated with each participant for each of the other participants, using position data of respective participants and the captured audio channels, each stereo audio channel pair representative of an audio perspective of the each participant from a virtual position of the each of the other participants.

9. The system as claimed in claim 1, further comprising:
    means for creating a virtual model of one or more three-dimensional objects;
    means for computing a stereo pair of video images of the virtual model for each of the participants, using position data of respective participants and the virtual model, each stereo pair of video images representative of a perspective view of the virtual model from a virtual view point of the each of the respective participants.

10. The system as claimed in claim 9, wherein one of the three-dimensional objects is a virtual meeting room.

11. The system as claimed in claim 9, further comprising:
    means for manipulating the virtual model; and
    means for using virtual model manipulation information to compute the stereo pair of video images of the virtual model.

12. A method for providing stereo videoconferencing for at least two participants in at least two separate locations, comprising steps of:

providing a reference point at each location;
sensing a relative position of each participant with respect to the reference point;
capturing at least two video images of each participant, each video image being captured from a different perspective;
computing a stereo pair of video images of each participant for each of the other participants;
communicating the respective stereo pairs of video images of each participant to each of the other participants; and
assembling a stereo video display image for each of the participants, using the position data and the stereo pairs of video images.

13. The method as claimed in claim 12, further comprising a step of isolating image data related to each participant from image data related to background in the captured images prior to the step of communicating.

14. The method as claimed in claim 13, wherein the step of computing a stereo pair of video images further comprises a step of selecting two captured video images most closely representing a left-eye view and a right-eye view from a virtual perspective of each of the respective participants.

15. The method as claimed in claim 14, wherein the step of computing a stereo pair of video images further comprises a step of transforming at least one of the two captured video images to create the left-eye view and the right-eye view from the virtual perspective of each of the respective participants.

16. The method as claimed in claim 13, wherein the step of computing a stereo pair of video images further comprises a step of compressing data representations of the digitized stereo pair of video images.

17. The method as claimed in claim 12, further comprising a step of capturing audio information from each participant.

18. The method as claimed in claim 17, wherein the audio information comprises two or more audio channels captured from different positions relative to the reference point of each location.

19. The method as claimed in claim 18, further comprising a step of computing a stereo audio channel pair associated with each participant for each of the other participants, using position data of respective participants and the captured audio channels, each stereo audio channel pair being representative of an audio perspective of the each participant from a virtual position of the each of the other participants.

20. The method as claimed in claim 12, further comprising steps of:
creating a virtual model of one or more three-dimensional objects;
computing a stereo pair of video images of the virtual model for each of the participants, using position data related to each of the respective participants and position data related to the virtual model, each stereo pair of video images representative of a perspective view of the virtual model from a virtual view point of each of the respective participants.

21. The method as claimed in claim 20, wherein one of the three-dimensional objects is a virtual meeting room.

22. The method as claimed in claim 20, further comprising steps of:
manipulating the virtual model; and
using virtual model manipulation information in the step of computing the stereo pair of video images of the virtual model in order to display the virtual model in a position resulting from the manipulation.

23. A system for integrating and synchronizing multi-source data, images and sounds to provide a single seamless, immersive videoconferencing environment for a plurality of participants respectively located in a plurality of different locations, comprising:
a position sensor in each location that provides a reference point and senses a position of each of the participants with respect to the respective reference points;
at least two cameras for simultaneously capturing at least two video images of each participant, each video image being captured from a different perspective; at least one microphone for capturing sound data from each location;
a processor for computing a stereo pair of video images of each participant and stereo sound data for each of the other participants using at least two video images, the sound data, and the respective positions of each of the other participants, and for communicating the respective stereo pairs of video images and the stereo sound data to a corresponding processor for each of the other participants; and
a processor for integrating and synchronizing the image and the stereo sound data received from each of the other participants to provide a seamless, immersive videoconferencing environment for each of the participants.

24. The system as claimed in claim 23 wherein the processor for integrating and synchronizing the image and stereo sound data is further adapted to integrate virtual three-dimensional object data to provide a single seamless, immersive videoconferencing environment that displays the virtual three-dimensional object as a part of the environment.

25. The system as claimed in claim 24 further comprising a motion/position tracker reserved for virtual object manipulation, the motion/position tracker being used in a predetermined way by a participant to move, rotate or flip the virtual object.

26. The system as claimed in claim 25 wherein the processor for integrating and synchronizing the image and the stereo sound data received from each of the other participants is further adapted to receive motion/position data from the motion/position tracker reserved for virtual object manipulation, and to communicate the motion/position data to a processor for integrating and synchronizing the image and the sound data received from each of the other participants.

27. The system as claimed in claim 24 further comprising a step of providing a motion/position tracker reserved for virtual object manipulation to at least one participant, to permit the at least one participant to move, rotate or flip the virtual object.

28. The system as claimed in claim 25 further comprising a step of integrating and synchronizing the image data received from each of the other participants with motion/position data from the at least one motion/position tracker reserved for virtual object manipulation, as well as integrating and synchronizing the stereo sound data received from each of the other participants.

29. The system as claimed in claim 23 further comprising a step of integrating three-dimensional object data into the seamless, immersive videoconferencing environment to display the virtual three-dimensional object as a part of the environment.

30. A method of integrating and synchronizing multi-source data, images and sounds to provide a single seamless, immersive videoconferencing environment for a plurality of participants respectively located in a plurality of different locations, comprising steps of:

determining a position of each participant with respect to a reference point in each of the respective locations;

simultaneously capturing at least two video images of each participant, each video image being captured from a different perspective;

capturing sound data at each location using at least one microphone;

computing a stereo pair of video images of each participant and stereo sound data for each of the other participants using at least two video images, the sound data, and the respective positions of each of the other participants, and communicating the respective stereo pairs of video images and the stereo sound data to a processor for each of the other participants; and integrating and synchronizing the image and the stereo sound data received from each of the other participants to provide a seamless, immersive videoconferencing environment for the respective participants.

* * * * *